United States Patent
Yang et al.

(10) Patent No.: US 12,428,251 B2
(45) Date of Patent: Sep. 30, 2025

(54) NON-STOP CONSTANT-SPEED EFFICIENT WINDING MACHINE

(71) Applicant: SHENZHEN GEESUN INTELLIGENT TECHNOLOGY CO., LTD., Guangdong (CN)

(72) Inventors: Rukun Yang, Guangdong (CN); Fei Chen, Guangdong (CN); Ji Yang, Guangdong (CN); Lingcong Li, Guangdong (CN); Xueke Wu, Guangdong (CN)

(73) Assignee: Shenzhen Geesun Intelligent Technology Co., Ltd., Guangdong (CN)

( * ) Notice: Subject to any disclaimer, the term of this patent is extended or adjusted under 35 U.S.C. 154(b) by 585 days.

(21) Appl. No.: 17/740,470

(22) Filed: May 10, 2022

(65) Prior Publication Data
US 2022/0363502 A1    Nov. 17, 2022

(30) Foreign Application Priority Data
May 11, 2021 (CN) .......................... 202110509137.X (51) Int. Cl.
*B65H 18/08*     (2006.01)
*B65H 18/16*     (2006.01)
(Continued)

(52) U.S. Cl.
CPC ........... *B65H 18/085* (2013.01); *B65H 18/16* (2013.01); *B65H 35/0006* (2013.01); *H01M 10/0409* (2013.01); *B65H 2701/19* (2013.01)

(58) Field of Classification Search
CPC ............ B65H 18/085; B65H 18/16; B65H 2301/413226; B65H 2701/19; B65H 2801/72; B65H 35/0006; H01M 10/0409
See application file for complete search history.

(56) References Cited

U.S. PATENT DOCUMENTS

2022/0363502 A1*   11/2022   Yang ...................... B65H 18/16

FOREIGN PATENT DOCUMENTS

| CN | 103052581 A | 4/2013 |
|---|---|---|
| CN | 103247826 A | 8/2013 |

(Continued)

OTHER PUBLICATIONS

The First Office Action of Priority Application No. CN 202110509137.X issued by the Chinese Patent Office on Mar. 1, 2022.
(Continued)

*Primary Examiner* — Minh N Trinh
(74) *Attorney, Agent, or Firm* — IP & T GROUP LLP (57) ABSTRACT

A non-stop constant-speed efficient winding machine for separator relates to the technical field of lithium ion cell manufacturing. The non-stop constant-speed efficient winding machine for separator includes a base plate, an electrode feeding mechanism, a winding mechanism, a separator cutting mechanism, and a separator compounding mechanism. The winding mechanism includes a winding head and three winding needles rotatably provided on the winding head. By additionally providing the separator compounding mechanism between the electrode feeding mechanism and the winding mechanism, thermal compounding of the separator is realized, and through rolling separator cutting of the separator cutting mechanism, the separator cutting is realized. The winding needle located at the winding position can adsorb a separator end after the cutting, and wind the separator end on an outer circumferential surface of the corresponding winding needle.

7 Claims, 8 Drawing Sheets

(51) Int. Cl.
*B65H 35/00* (2006.01)
*H01M 10/04* (2006.01)

(56) References Cited

FOREIGN PATENT DOCUMENTS

| CN | 105609879 A | 5/2016 | | |
|---|---|---|---|---|
| CN | 206480709 U | 9/2017 | | |
| CN | 111146506 A | 5/2020 | | |
| CN | 212161995 U | 12/2020 | | |
| CN | 112467229 A | 3/2021 | | |
| CN | 113241480 B | * 11/2022 | ........... | B65H 18/085 |

OTHER PUBLICATIONS

First search of priority document CN 202110509137.X.
Search Report for European Patent Application No. 22171979.2 issued by the Dec. 8, 2022.

* cited by examiner

NON-STOP CONSTANT-SPEED EFFICIENT WINDING MACHINE

CROSS-REFERENCE TO RELATED APPLICATION

The present disclosure claims the priority to the Chinese patent application filed with the Chinese Patent Office on May 11, 2021 with the filing No. 202110509137.X, and entitled "Non-stop Constant-speed Efficient Winding Machine for Separator", all the contents of which are incorporated herein by reference in entirety.

TECHNICAL FIELD

The present disclosure relates to the technical field of lithium cell manufacturing, and particularly to a non-stop constant-speed efficient winding machine for separator.

BACKGROUND ART

During the development of lithium cell devices, the ultimate efficiency is consistently pursued in the industry, and is also an important power for pushing the development of lithium cell industry. The winding of the jellyroll of the lithium cell is mainly completed by a winding machine, i.e., the winding machine winds a positive electrode, a negative electrode, and a separator in a certain order, winds them to a fixed length, and adheres terminating tape to form the jellyroll of the lithium cell, wherein the fixed-length winding of the electrodes and the separator is mainly completed by a winding device, and the process of adhering the terminating tape for the wound jellyroll is completed by the winding device and a terminating tape adhering device in cooperation with each other. It can be seen that the winding device is a core device of the jellyroll winding machine, and it can play a decisive role both in the production efficiency of the jellyroll winding machine and the quality of the jellyroll wound.

In the prior art, it is usually necessary to wind the separator and the electrodes and then deliver them to a winding needle on a winding head for winding, and the feeding is carried out in a mode of feeding the compounded sheet to the center of the winding needle. As the winded electrodes and separator are in a dispersed state, this mode requires re-feeding when the working station is switched, and the feeding action cannot be continuously performed, thereby undoubtedly increasing the auxiliary time, and reducing the winding efficiency (i.e., the efficiency of producing the jellyroll by a winding machine).

SUMMARY

An objective of the present disclosure includes, for example, providing a non-stop constant-speed efficient winding machine for separator, which can realize constant-speed feeding of the separator without shutdown, and improve the production efficiency in the winding process (i.e., in the production process of the winding machine).

Embodiments of the present disclosure may be implemented as follows.

In a first aspect, the present disclosure provides a non-stop constant-speed efficient winding machine for separator, including a base plate, an electrode feeding mechanism, a winding mechanism, a separator cutting mechanism, and a separator compounding mechanism, wherein all of the electrode feeding mechanism, the separator cutting mechanism, the separator compounding mechanism, and the winding mechanism are provided on the base plate, the separator compounding mechanism is located between the electrode feeding mechanism and the winding mechanism, the electrode feeding mechanism is configured to transport an electrode and a separator to the separator compounding mechanism, and the separator compounding mechanism is configured to thermally compound the separator and tightly clamp the separator; and the winding mechanism includes a winding head and three winding needles rotatably provided on the winding head, the winding head is rotatably provided on the base plate, and has a winding position, a taping position, and an unloading position, the three winding needles can be switched clockwise or anticlockwise at the winding position, the taping position, and the unloading position, the separator cutting mechanism is provided close to the winding head for cutting the thermally compounded separator, the winding needle located at the winding position is configured to adsorb a separator end after the cutting, and wind the separator end on an outer circumferential surface of the corresponding winding needle, so that the electrodes and the separator are wound to form an jellyroll, the winding needle located at the taping position is configured to wind a separator tail after the cutting and adhere the tape to the jellyroll, and the winding needle located at the unloading position is configured to discharge the jellyroll to which the tape is adhered.

In an optional embodiment, the separator compounding mechanism includes a thermal compounding box, a first hot press roller, and a second hot press roller, the thermal compounding box is provided on the base plate, and a heating assembly is disposed therein, the first hot press roller and the second hot press roller are rotatably provided in the thermal compounding box, for approaching each other at a pre-winding stage of the separator to realize thermal compounding of the separator, and getting away from each other at a winding stage of the electrodes.

In an optional embodiment, a first hot press driving structure and a second hot press driving structure are provided in the thermal compounding box, the first hot press driving structure is in transmission connection with the first hot press roller for driving the first hot press roller to get close to or away from the second hot press roller, and the second hot press driving structure is in transmission connection with the second hot press roller for driving the second hot press roller to get close to or away from the first hot press roller.

In an optional embodiment, the separator cutting mechanism includes a first linear driving structure, a rotational driving structure, and a cutting roller, wherein the first linear driving structure is provided on the base plate, and the rotational driving structure is in transmission connection with the first linear driving structure, to get close to or away from the winding position under the driving of the first linear driving structure, the cutting roller is in transmission connection with the rotational driving structure, to rotate under the driving of the rotational driving structure, the cutting roller has a separator cutter, and the cutting roller is configured to cut the separator when a rotation speed is the same as a rotation speed of the winding needle located at the winding position.

In an optional embodiment, the winding mechanism further includes a separator pressing mechanism, the separator pressing mechanism is provided on the base plate, and has a telescopic first pressing arm, an end of the first pressing arm is provided with a first pressing roller, an intermediate passing roller is further provided between each two winding needles, the first pressing arm is configured to abut against the intermediate passing roller between the winding position and the taping position, so that the first pressing roller and the corresponding intermediate passing roller tightly clamp the separator tail.

In an optional embodiment, the winding mechanism further includes a pressing mechanism, the pressing mechanism is provided on the base plate, and has a telescopic second pressing arm, an end of the second pressing arm is provided with a second pressing roller, and the second pressing roller is configured to abut against the winding needle located at the taping position, so that the second pressing roller tightly presses the separator.

In an optional embodiment, the winding mechanism further includes a taping mechanism, wherein the taping mechanism has one end rotatably provided on the base plate, and the other end provided with a taping roller, and the taping roller is configured adhere tape to the jellyroll.

In an optional embodiment, the electrode feeding mechanism includes a clamping-plate feeding assembly and a cutter assembly, the clamping-plate feeding assembly is movably provided on the base plate, and can move along a conveying direction of the electrode for clamping the electrode when remaining relatively stationary with the electrode, and the cutter assembly is movably provided on the base plate, can move along the conveying direction of the electrode, and cut off the electrode when remaining relatively stationary with the electrode.

In an optional embodiment, the clamping-plate feeding assembly includes a second linear driving structure, a clamping-plate mounting base, a clamping driving structure, a fixed clamping plate, and a movable clamping plate, the second linear driving structure is movably provided on the base plate, and the clamping-plate mounting base is in transmission connection with the second linear driving structure, for moving along the conveying direction of the electrode under the driving of the second linear driving structure, the fixed clamping plate is fixedly provided on the clamping-plate mounting base, the movable clamping plate is movably provided on the clamping-plate mounting base, and the clamping driving structure is provided on the clamping-plate mounting base and is in transmission connection with the movable clamping plate, for driving the movable clamping plate close to or away from the fixed clamping plate.

In an optional embodiment, the cutter assembly includes a third linear driving structure, a cutter mounting base, a cutter driving member, a fixed cutter, and a movable cutter, wherein the third linear driving structure is movably provided on the base plate, and the cutter mounting base is in transmission connection with the third linear driving structure, for moving along the conveying direction of the electrode under the driving of the third linear driving structure, the fixed cutter is fixedly mounted on the cutter mounting base, the movable cutter is movably mounted on the cutter mounting base, and the cutter driving member is provided on the cutter mounting base and is in transmission connection with the movable cutter, for driving the movable cutter close to or away from the fixed cutter.

The embodiments of the present disclosure include, for example, the following beneficial effects.

For the non-stop constant-speed efficient winding machine for separator provided in the present disclosure, the winding head has the winding position, the taping position, and the unloading position. By seamlessly switching the three winding needles between the three working stations, and meanwhile additionally providing the separator compounding mechanism between the electrode feeding mechanism and the winding mechanism, the separator is thermally compounded, so that the separator is compounded into one piece, and the separator is cut by the separator cutting mechanism. When one of the winding needles winds a preset length and needs to switch the working station by the winding head, the winding needle located at the winding position can adsorb the cut separator end, and wind the separator end on the outer circumferential surface of the corresponding winding needle, and the separator tail is continuously wound by the winding needle rotated to the taping position. As the part of separator pre-wound is compounded into one piece, the winding needle can realize one-time adsorption and winding, and further realize that the winding action is continuously performed without stopping. Compared with the prior art, the present disclosure can realize constant-speed feeding of the separator without shutdown, and optimize the separator tension, and improve the production efficiency in the winding process.

BRIEF DESCRIPTION OF DRAWINGS

In order to more clearly illustrate technical solutions of embodiments of the present disclosure, accompanying drawings which need to be used in the embodiments will be introduced briefly below. It should be understood that the accompanying drawings below merely show some embodiments of the present disclosure, therefore, they should not be considered as limiting the scope, and a person ordinarily skilled in the art still could obtain other relevant drawings according to these accompanying drawings, without using creative efforts.

Reference signs: 100—non-stop constant-speed efficient winding machine for separator; 110—base plate; 130—electrode feeding mechanism; 131—clamping-plate feeding assembly; 1311—fixed clamping plate; 1313—movable clamping plate; 133—cutter assembly; 1331—fixed cutter; 1333—movable cutter; 150—winding mechanism; 151—winding head; 153—winding needle; 154—taping mechanism; 1541—taping roller; 155—winding position; 156—pressing mechanism; 1561—second pressing arm; 1563—second pressing roller; 157—taping position; 158—separator pressing mechanism; 1581—first pressing arm; 1583—first pressing roller; 1585—intermediate passing roller; 159—unloading position; 170—separator cutting mechanism; 171—first linear driving structure; 173—rotational driving structure; 175—cutting roller; 190—separator compounding mechanism; 191—thermal compounding box; 193—first hot press roller; 195—second hot press roller; 197—first hot press driving structure; 199—second hot press driving structure.

DETAILED DESCRIPTION OF EMBODIMENTS

In order to make the objectives, technical solutions, and advantages of the embodiments of the present disclosure clearer, the technical solutions in the embodiments of the present disclosure will be described below clearly and completely in conjunction with the accompanying drawings in the embodiments of the present disclosure. Apparently, only some but not all embodiments of the present disclosure are described. Generally, components in the embodiments of the present disclosure, as described and shown in the accompanying drawings herein, may be arranged and designed in various different configurations.

Therefore, the detailed description below of the embodiments of the present disclosure provided in the accompanying drawings is not intended to limit the claimed scope of the present disclosure, but merely illustrates chosen embodiments of the present disclosure. On the basis of the embodiments of the present disclosure, all of other embodiments, obtained by a person ordinarily skilled in the art without paying inventive efforts, should fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "upper", "lower", "inner", and "outer", if any, are based on orientation or positional relationships as shown in the drawings, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limiting the present disclosure.

Besides, terms such as "first" and "second", if appear, are merely for distinctive description, but should not be construed as indicating or implying importance in the relativity.

As disclosed in the background art, in the prior art, the electrodes and the separator are not thermally compounded before the electrodes and the separator are wound by the winding needle, that is to say, the electrodes and the separator are in a dispersed state during the winding in the prior art, which results in that after the previous winding and cutting is completed, the electrode feeding mechanism needs to be stopped, and after the station switching of the winding head is completed, the electrodes and the separator are re-fed from the middle of the winding needle, then the electrode feeding mechanism is started again. This method undoubtedly increases the auxiliary time. Furthermore, in the prior art, the electrode feeding mechanism also needs to perform a cutting operation when feeding, and a shutdown operation is also needed when cutting the electrodes, further increasing the auxiliary time and affecting the winding efficiency.

In order to improve the winding efficiency, embodiments of the present disclosure provide a non-stop constant-speed efficient winding machine for separator capable of implementing non-stop constant-speed feeding, and it should be noted that the features in the embodiments of the present disclosure may be combined with each other if there is no conflict.

EMBODIMENTS

Figure 1:
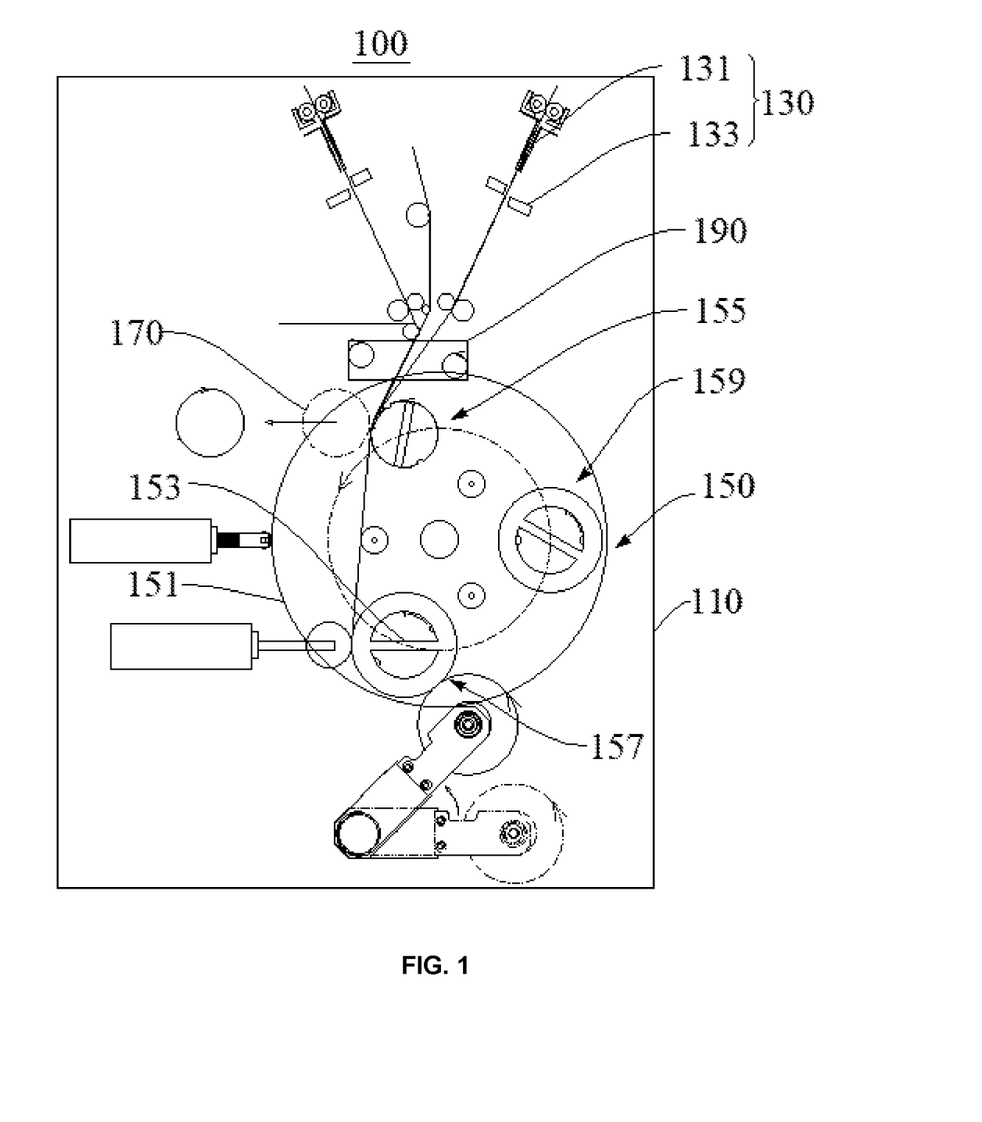
FIG. 1 to FIG. 3 are structural schematic views of a non-stop constant-speed efficient winding machine for separator provided in an embodiment of the present disclosure at different stages.
Figure 2:
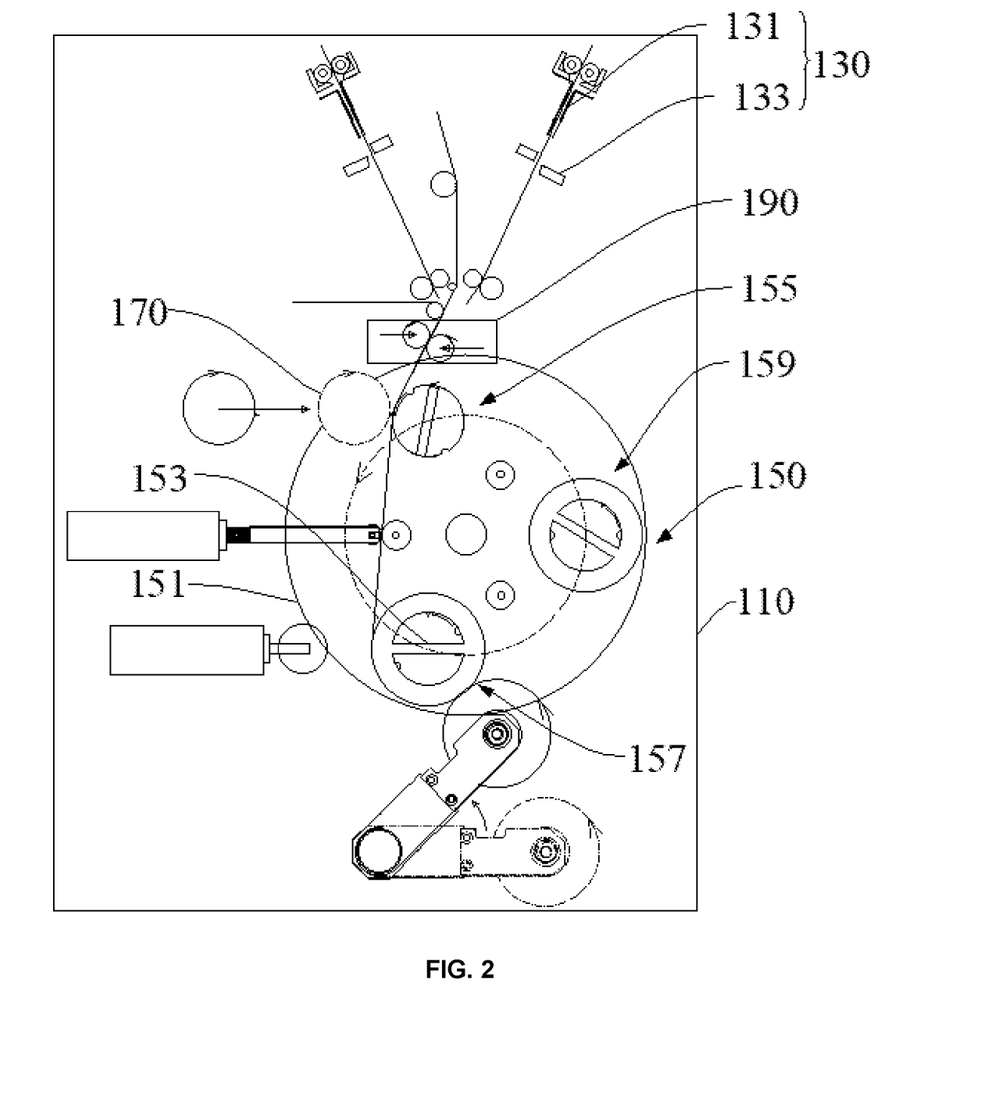
Figure 3:
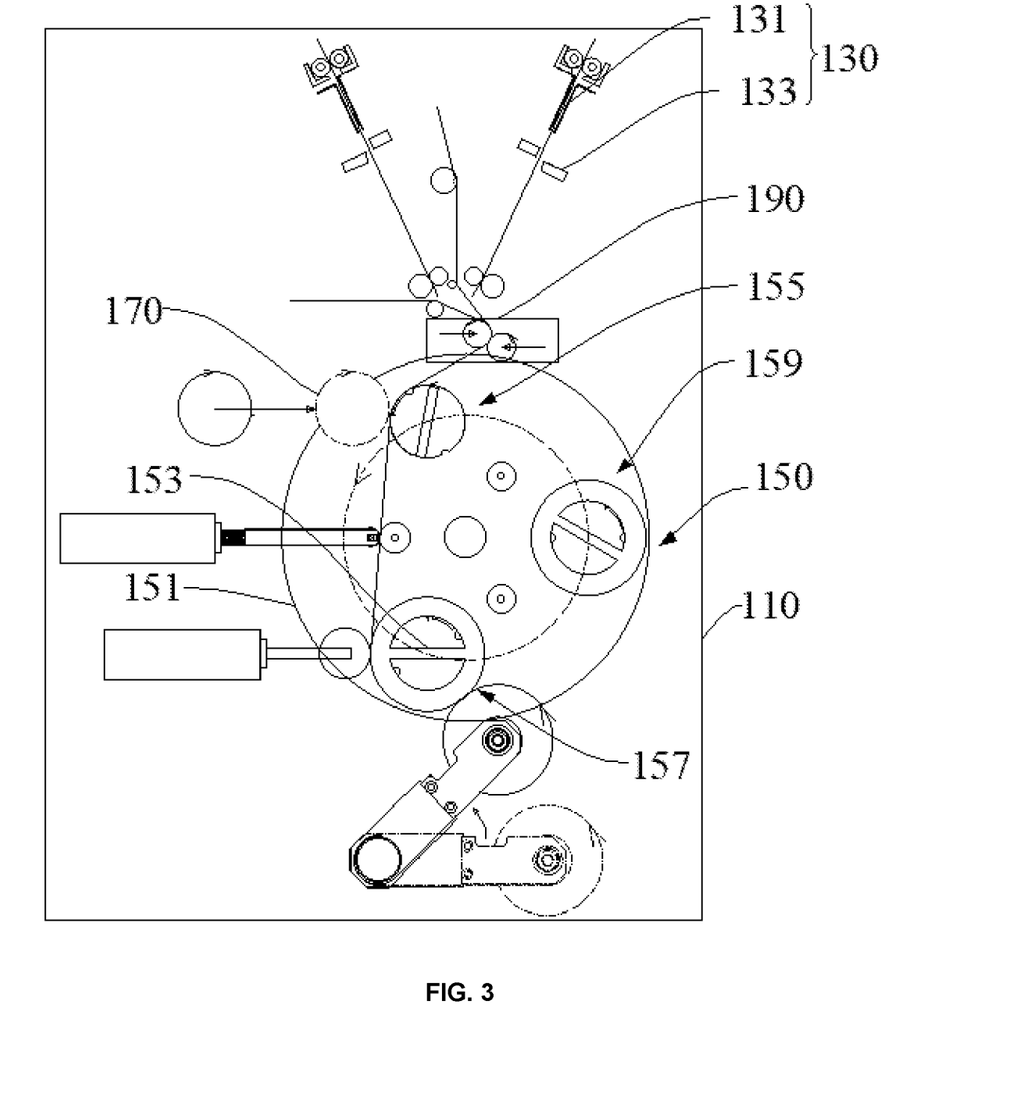

Referring to FIG. 1 to FIG. 3, the present embodiment provides a non-stop constant-speed efficient winding machine for separator 100, which can realize non-stop constant-speed efficient winding, improve the winding efficiency, and meanwhile also avoid product abnormality caused by unstable separator tension as the separator is not stopped.

The non-stop constant-speed efficient winding machine for separator 100 provided in the present embodiment includes a base plate 110, an electrode feeding mechanism 130, a winding mechanism 150, a separator cutting mechanism 170, and a separator compounding mechanism 190, wherein all of the electrode feeding mechanism 130, the separator cutting mechanism 170, the separator compounding mechanism 190, and the winding mechanism 150 are provided on the base plate 110, the separator compounding mechanism 190 is located between the electrode feeding mechanism 130 and the winding mechanism 150, the electrode feeding mechanism 130 is configured to transport an electrode and a separator to the separator compounding mechanism 190, and the separator compounding mechanism 190 is configured to thermally compound the separator and tightly clamp the separator.

The winding mechanism 150 includes a winding head 151 and three winding needles 153 rotatably provided on the winding head 151, and the winding head 151 is rotatably provided on the base plate 110, and has a winding position 155, a taping position 157, and a unloading position 159, and the three winding needles 153 can be switched clockwise or anticlockwise at the winding position 155, the taping position 157, and the unloading position 159, the separator cutting mechanism 170 is provided close to the winding head 151 for cutting the thermally compounded separator, and the winding needle 153 located at the winding position 155 is configured to adsorb the separator end after the cutting, and wind the separator end on an outer circumferential surface of the corresponding winding needle 153, so that the electrodes and the separator are wound to form an jellyroll. The winding needle 153 located at the taping position 157 is configured to wind the separator tail after the cutting and adhere the tape to the jellyroll. The winding needle 153 located at the unloading position 159 is configured to discharge the jellyroll to which the tape is adhered.

It should be noted that the separator end mentioned in the present embodiment refers to an end of the separator close to a feeding side after the cutting, and the separator tail mentioned in the present embodiment refers to a residual tail wound on the winding needle 153 after the separator is cut. The thermally compounded separator is cut by the separator cutting mechanism 170, thereby forming a separator end and a separator tail, wherein the separator end is wound after being directly adsorbed by the winding needle 153 switched to the winding position 155, without the need of passing through the center of the winding needle 153, that is, the separator passes through the outer circumferential surface of the winding needle 153 to realize cutting and head-tail separation, and meanwhile the separator end is fixedly attached to the outer circumferential surface of the winding needle 153, the separator tail continues to be wound by the winding needle 153 switched to the taping position 157, and during the switching of the working station, the rotation action of the winding needle 153 continues for continuous winding, and when the action of station switching is completed, a linear speed of rotation of the winding needle 153 on the winding position 155 is consistent with a moving speed of the separator, meanwhile, the separator cutting mechanism 170 cuts off the separator, and the winding needle 153 can directly adsorb the separator end to perform the winding operation, thereby realizing the seamless switching of the separator end, thus, the separator can keep a constant-speed motion.

It should also be noted that, in the present embodiment, the winding needle 153 adopts an adsorption winding process, which is different from the conventional arrangement of winding through the center of the winding needle. In the present disclosure, by providing an adsorption structure such as a vacuum adsorption structure or an adhesive structure on the outer circumferential surface of the winding needle 153, the separator end is directly adsorbed, so that the separator end can be stuck to the outer circumferential surface of the winding needle 153, thereby realizing constant-speed feeding of the separator, and continuous winding action of the winding needle 153. In the above, the separator is fed at a constant speed, which includes the case of deceleration and speed change of the electrode.

In the present embodiment, to adopt a three-head winding needle structure can enable winding, tape adhering, and discharging to be performed simultaneously, which undoubtedly further improves the molding efficiency of the jellyroll, wherein after the unloading position 159 completes the discharging, following the rotation of the winding head 151, the new winding needle 153 is switched to the winding position 155 to perform the next winding operation.

It should be noted that a double-head or four-head winding machine may also be used in the present embodiment.

In the present embodiment, the winding head 151 has a winding position 155, a taping position 157, and an unloading position 159. By seamlessly switching the three winding needles 153 between the three working stations, and meanwhile additionally providing the separator compounding mechanism 190 between the electrode feeding mechanism 130 and the winding mechanism 150, the separator is thermally compounded, so that the separator is compounded into a whole, and the separator is cut by the separator cutting mechanism 170. When one of the winding needles 153 winds a preset length and needs to switch the working station by the winding head 151, the winding needle 153 located at the winding position 155 can adsorb and wind the cut separator end, and the separator tail is continuously wound by the winding needle 153 rotated to the taping position 157. As the separator is compounded into a whole, the winding needle 153 can realize one-time adsorption and winding, and further realize that the winding action is continuously performed without stopping.

Figure 4:
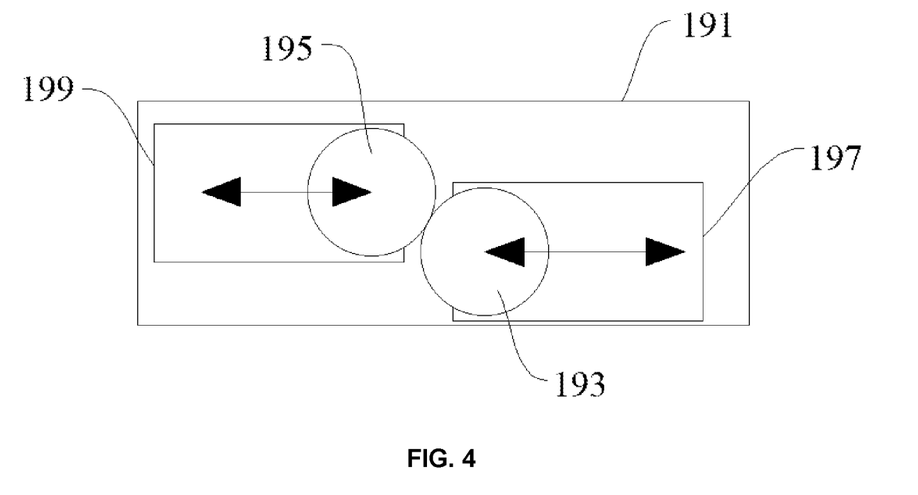
FIG. 4 is a structural schematic view of an electrode feeding mechanism in FIG. 1.

Referring to FIG. 4, the separator compounding mechanism 190 includes a thermal compounding box 191, a first hot press roller 193, and a second hot press roller 195. The thermal compounding box 191 is provided on the base plate 110, and a heating assembly (not shown) is disposed therein. The first hot press roller 193 and the second hot press roller 195 are rotatably provided in the thermal compounding box 191, for approaching each other at the pre-winding stage of the separator to realize thermal compounding of the separator, and getting away from each other at the winding stage of the electrodes. Specifically, the heating assembly may be a heating element such as an infrared heating tube or a resistive wire heating tube. Certainly, the specific type of the heating assembly herein is not specifically limited, as long as the heating environment can be realized in the thermal compounding box 191.

In other preferable embodiments of the present disclosure, the separator compounding mechanism 190 may also compound the separator into one piece in other manners, for example, by ultrasonic compounding, or by adhering an adhesive, and the compounding manner of the separator is not specifically limited herein. Certainly, the separator also adopts other compounding manners such as lamination after glue dispensing (a glue dispensing mechanism is added in the front) and cold pressing.

It should be noted that, the jellyroll formed in the present embodiment includes an anode plate, a cathode plate, and two layers of separator, and in the present embodiment, the separator compounding mechanism 190 merely compounds the separator between the electrode-sheet tail of the previous jellyroll and the electrode-sheet head of the next jellyroll, that is, thermally compounding the overlapping portions of the separators, thereby ensuring that the separators can be compounded into one piece after the separators are cut.

In the present embodiment, a first hot press driving structure 197 and a second hot press driving structure 199 are provided in the thermal compounding box 191, and the first hot press driving structure 197 is in transmission connection with the first hot press roller 193 for driving the first hot press roller 193 to get close to or away from the second hot press roller 195, and the second hot press driving structure 199 is in transmission connection with the second hot press roller 195 for driving the second hot press roller 195 to get close to or away from the first hot press roller 193. Specifically, the first hot press driving structure 197 and the second hot press driving structure 199 are both motors, and the first hot press roller 193 and the second hot press roller 195 can be close to or away from each other under the driving of the motor, so that the laminating force can be adjusted and the thermal compounding effect can be ensured. Preferably, the position of a compounding point may be set by the motor, so that the electrodes and the separator can be buffered more by setting the eccentricity, functioning to buffer the electrodes and the separator. Furthermore, after the separator is cut by the separator cutting mechanism 170, the first hot press roller 193 and the second hot press roller 195 can also clamp the separator, so as to avoid the separator from being contracted due to the tension to influence the subsequent winding action.

Figure 5:
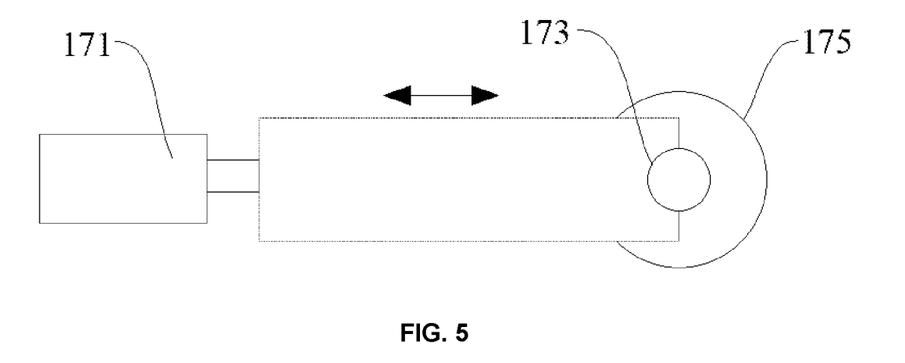
FIG. 5 is a structural schematic view of a separator compounding mechanism in FIG. 1.

Referring to FIG. 5, the separator cutting mechanism 170 includes a first linear driving structure 171, a rotational driving structure 173, and a cutting roller 175. The first linear driving structure 171 is provided on the base plate 110, and the rotational driving structure 173 is in transmission connection with the first linear driving structure 171, to get close to or away from the winding position 155 under the driving of the first linear driving structure 171. The cutting roller 175 is in transmission connection with the rotational driving structure 173, to rotate under the driving of the rotational driving structure 173. The cutting roller 175 has a separator cutter, and the cutting roller 175 is configured to cut the separator when the rotation speed is the same as the rotation speed of the winding needle 153 located at the winding position 155. Specifically, the first linear driving structure 171 may be a cylinder, and the rotational driving structure 173 may be a motor, the first linear driving structure 171 drives the rotational driving structure 173 to get close to or away from the winding position 155, the rotational driving structure 173 is directly connected to the cutting roller 175, and drives the cutting roller 175 to rotate. During the process of the cutting roller 175 getting close to the winding position 155, the rotational driving structure 173 drives the cutting roller 175 to continuously accelerate until its speed reaches the same linear speed as the winding needle 153 on the winding position 155. At this time, the winding needle 153 on the winding position 155, the cutting roller 175, and the separator have the same linear speed, then the actions of cutting, adsorption and winding can be completed while ensuring the constant-speed movement of the separator, avoiding shutdown of the feeding side.

It should be noted that in addition to the way of cutting with the cutter adopted by the separator cutting mechanism 170, the separator also may be cut off with a hot wire or other separator cutting methods.

In the present embodiment, the winding mechanism 150 further includes a separator pressing mechanism 158, and the separator pressing mechanism 158 is provided on the base plate 110, and has a telescopic first pressing arm 1581. An end of the first pressing arm 1581 is provided with a first pressing roller 1583. An intermediate passing roller 1585 is further provided between each two winding needles 153. The first pressing arm 1581 is configured to abut against the intermediate passing roller 1585 between the winding position 155 and the taping position 157, so that the first pressing roller 1583 and the corresponding intermediate passing roller 1585 tightly clamp the separator tail. Specifically, after the separator is cut off by the cutting roller 175, the separator tail will droop under the action of gravity as there is no bearing point, therefore after the winding head 151 completes the switching of working station, before the separator is cut off, the first pressing arm 1581 is in a stretching state, so that the first pressing roller 1583 and the intermediate passing roller 1585 can tightly clamp the separator, and the tensioned state of the lower separator is maintained after the separator is cut off, facilitating the separator tail in continuing to be wound on the winding needle 153.

It should be noted that the first pressing arm 1581 herein adopts a telescopic structure, and for a specific telescopic structure, reference can be made to a mode in which the cylinder drives the movement of the piston rod. With the telescopic structure, when the winding head 151 switches the working station, the winding needle 153 and the separator pressing mechanism 158 can be prevented from interfering each other.

Figure 6:
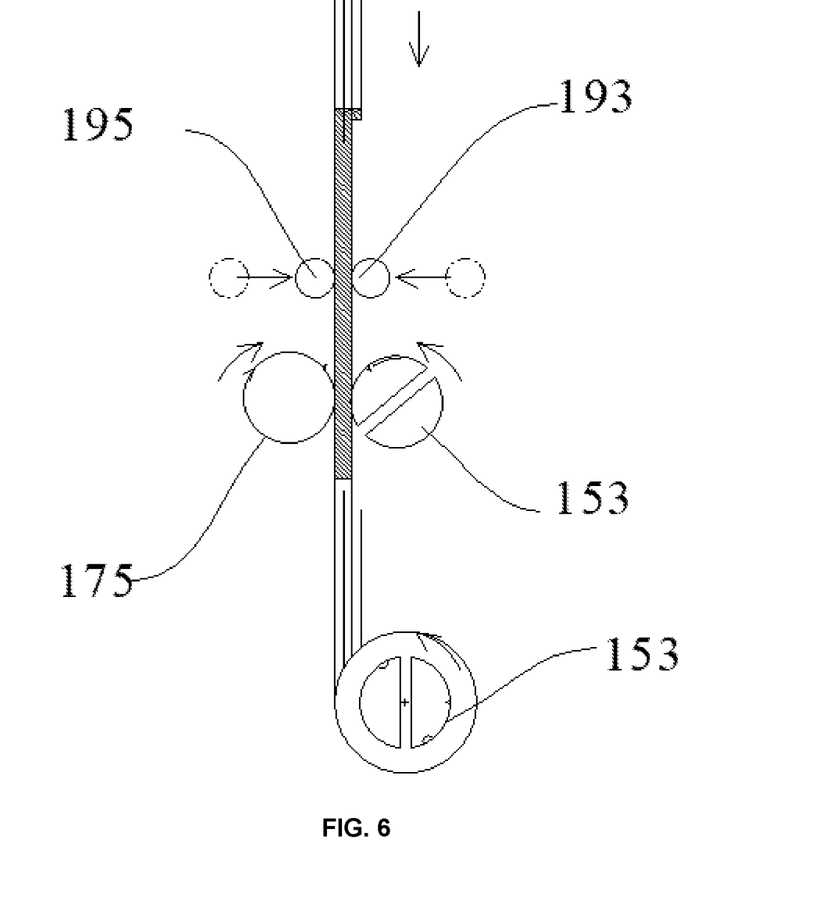
FIG. 6 and FIG. 7 are schematic views of a separator cutting process.
Figure 7:
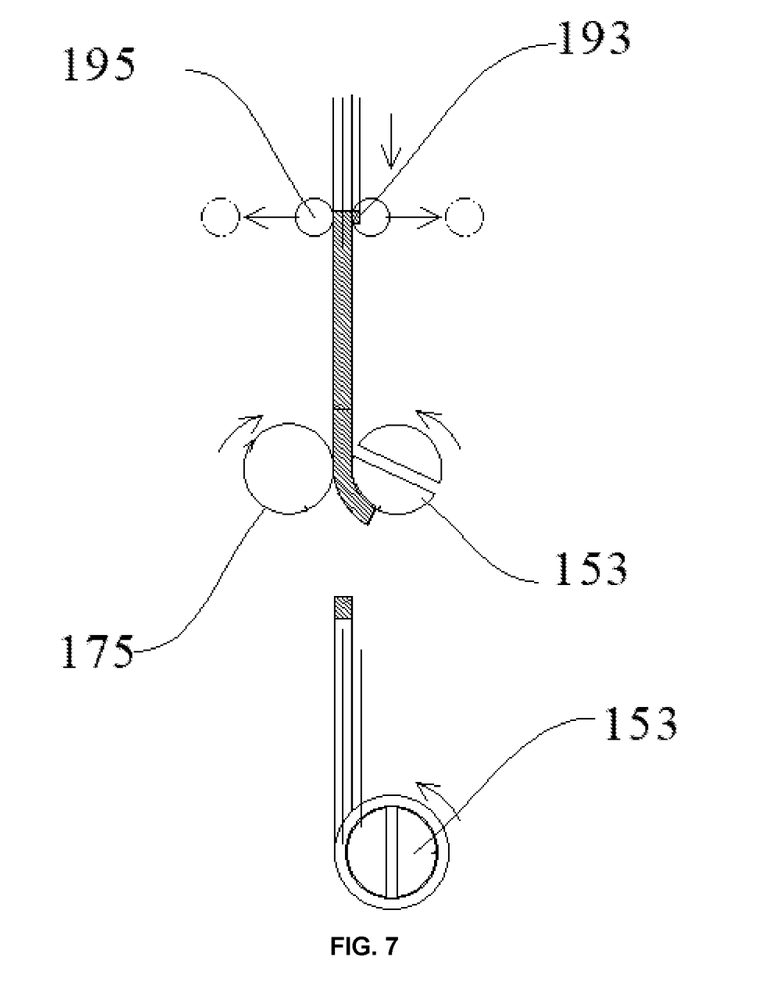

Referring to FIG. 6 and FIG. 7, the operation process of the separator compounding mechanism 190 and the separator cutting mechanism 170 will be further described below.

In the winding process, the winding head 151 rotates the working stations, after the winding is completed, the electrode is cut off, and after the cutting, the electrode-sheet tail and the separator pass through the separator compounding mechanism 190, the separator compounding mechanism 190 closes the mold and rotates on its own axis to follow the separator at a constant speed, so as to perform thermal compounding on the separator, and the overlapping portions of the separators are compounded into a whole. The new winding needle 153 is continuously rotated, the cutting roller 175 is close to the new winding needle 153, and a vacuum adsorption structure is provided on the winding needle 153. When the winding needle 153 is rotated to have the speed consistent with that of the electrode and the separator, the cutting roller 175 gets close to the winding needle, and cuts off the separator by a separator cutter thereon when being rotated to close the mold with the winding needle 153, and a separator end and a separator tail are formed, wherein the separator tail is continuously wound by the winding needle 153 located at the taping position 157, and the separator end is vacuum-adsorbed and wound by the winding needle 153 to form a new jellyroll.

In the present embodiment, the separator cutter adopts a retractable structure, that is, the separator cutter extends outward from the cutting roller 175 at the right time to cut off the separator, and meanwhile retracts again after cutting. At a pre-winding stage of the separator end, the cutting roller 175 may press the winding needle 153, so that the pre-winding effect of the winding needle 153 is better.

Figure 8:
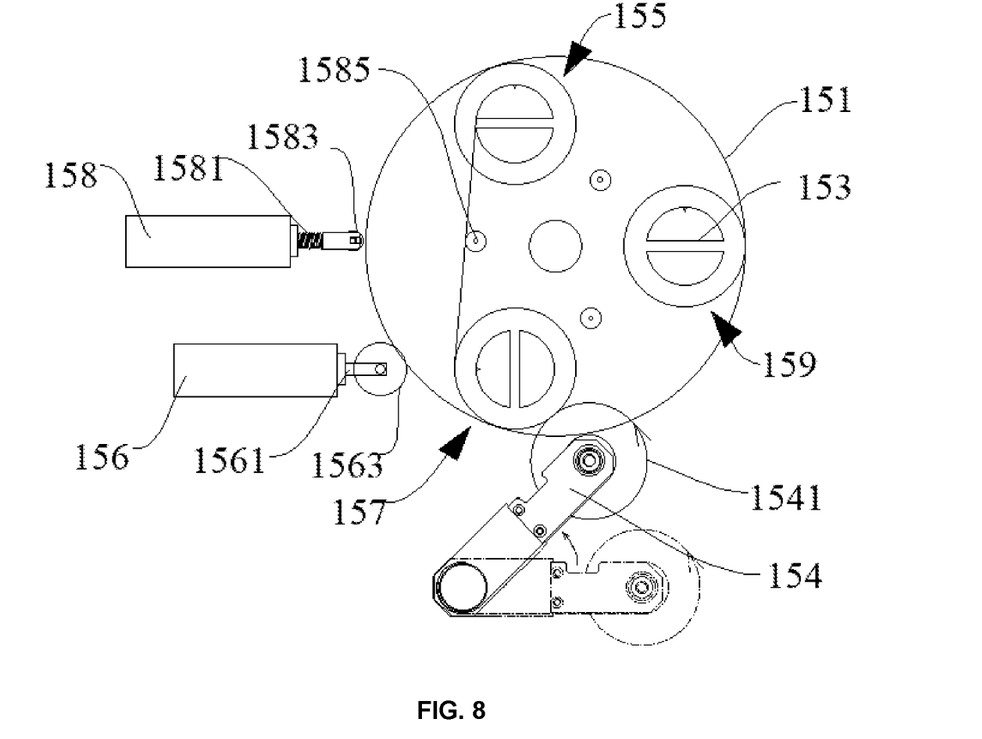
FIG. 8 is a structural schematic view of a separator cutting mechanism in FIG. 1.

Referring to FIG. 8, in the present embodiment, the winding mechanism 150 further includes a pressing mechanism 156, and the pressing mechanism 156 is provided on the base plate 110, and has a telescopic second pressing arm 1561, and an end of the second pressing arm 1561 is provided with a second pressing roller 1563. The second pressing roller 1563 is configured to abut against the winding needle 153 located at the taping position 157, so that the second pressing roller 1563 tightly presses the separator. Specifically, after passing the intermediate passing roller 1585 and the first pressing arm 1581, the separator tail will droop under the action of gravity as there is no bearing point, and in this case, by making the second pressing arm 1561 get close to the winding needle 153 located at the taping position 157, the second pressing roller 1563 is in close contact with the winding needle 153 on the taping position 157, ensuring that the separator tail is smoothly continuously wound on the winding needle 153, and meanwhile, after the tape adhering is completed, it can also achieve the pressing function.

In the present embodiment, the winding mechanism 150 further includes a taping mechanism 154, wherein the taping mechanism 154 has one end rotatably provided on the base plate 110, and the other end provided with a taping roller 1541, and the taping roller 1541 is configured to adhere the tape to the jellyroll. Specifically, one end of the taping mechanism 154 is provided with a rotating shaft, and by rotatably providing the rotating shaft on the base plate 110, the taping mechanism 154 can rotate around the rotating shaft, thereby driving the taping roller 1541 close to or away from the taping position 157. As to the specific structure and the tape adhering principle of the taping roller 1541, reference can be made to the existing tape adhering mechanism, which are not described in detail herein again.

Figure 9:
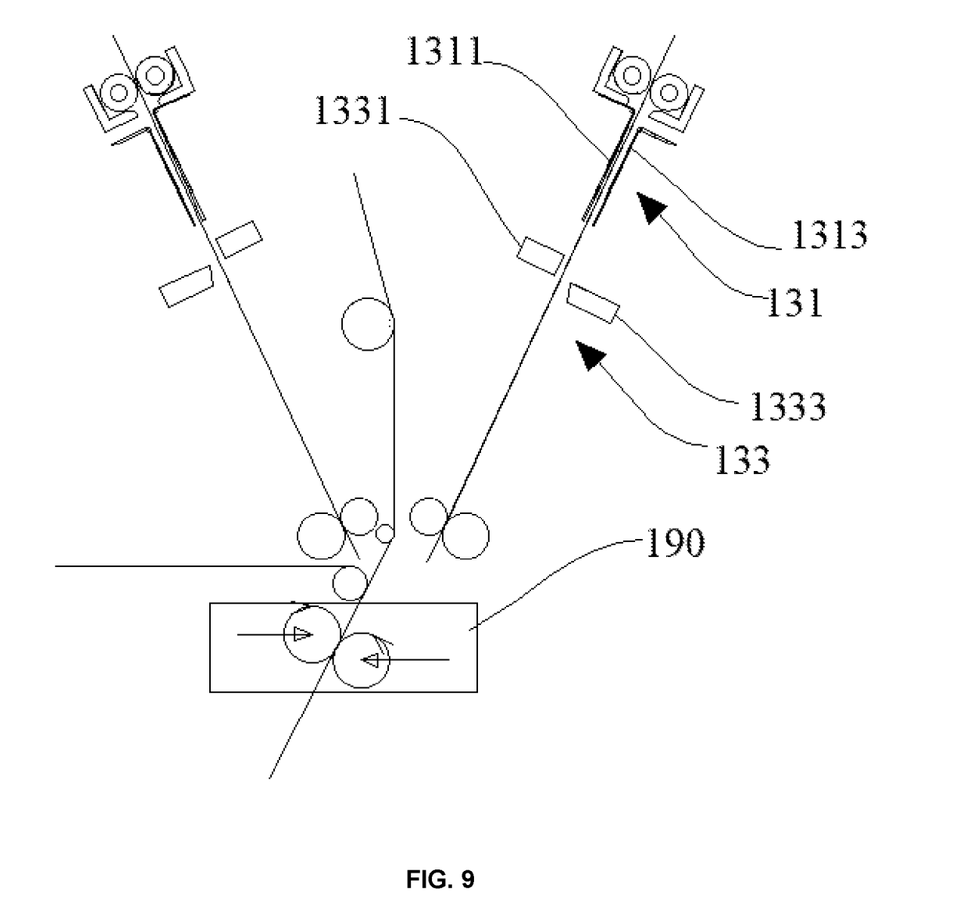
FIG. 9 is a structural schematic view of a winding mechanism in FIG. 1.

Referring to FIG. 9, the electrode feeding mechanism 130 includes a clamping-plate feeding assembly 131 and a cutter assembly 133, wherein the clamping-plate feeding assembly 131 is movably provided on the base plate 110, and can move along a conveying direction of the electrode for clamping the electrode when remaining relatively stationary with the electrode, the cutter assembly 133 is movably provided on the base plate 110, can move along the conveying direction of the electrode, and cuts off the electrode when remaining relatively stationary with the electrode. Specifically, the cutter assembly 133 can realize a chase cutting function, namely, the cutter assembly 133 cuts off the electrode when moving to the speed consistent with that of the electrode, thereby not only ensuring the cutting effect, but also avoiding the interruption of incoming materials.

It should be noted that in the present embodiment, there are two electrode feeding mechanisms 130, and there are also two layers of separator, so as to realize the winding of double-layer separators and electrodes.

Specifically, the clamping-plate feeding assembly 131 includes a second linear driving structure (not shown), a clamping-plate mounting base (not shown), a clamping driving structure (not shown), a fixed clamping plate 1311, and a movable clamping plate 1313. The second linear driving structure is movably provided on the base plate 110, and the clamping-plate mounting base is in transmission connection with the second linear driving structure, for moving along the conveying direction of the electrode under the driving of the second linear driving structure, the fixed clamping plate 1311 is fixedly provided on the clamping-plate mounting base, the movable clamping plate 1313 is movably provided on the clamping-plate mounting base, and the clamping driving structure is provided on the clamping-plate mounting base and is in transmission connection with the movable clamping plate 1313, for driving the movable clamping plate 1313 close to or away from the fixed clamping plate 1311. Specifically, the second linear driving structure may be a cylinder or a linear motor, and the driving direction thereof is consistent with the moving direction of the electrode, so that the clamping-plate mounting base is driven to move in parallel with the electrode, and the clamping driving structure can be a cylinder, and drives the movable clamping plate 1313 close to or away from the fixed clamping plate 1311. Through the clamping action of the movable clamping plate 1313 and the fixed clamping plate 1311, the electrodes can be clamped after the cutter assembly 133 cuts off the electrodes, preventing the electrodes from losing the tension support, and the electrodes are clamped to get close to the winding position 155 under the driving of the second linear driving structure, realizing the feeding and winding action.

The cutter assembly 133 includes a third linear driving structure (not shown), a cutter mounting base (not shown), a cutter driving member (not shown), a fixed cutter 1331, and a movable cutter 1333. The third linear driving structure is movably provided on the base plate 110, and the cutter mounting base is in transmission connection with the third linear driving structure, for moving along the conveying direction of the electrode under the driving of the third linear driving structure, the fixed cutter 1331 is fixedly mounted on the cutter mounting base, the movable cutter 1333 is movably mounted on the cutter mounting base, and the cutter driving member is provided on the cutter mounting base and is in transmission connection with the movable cutter 1333, for driving the movable cutter 1333 close to or away from the fixed cutter 1331. Specifically, the third linear driving structure may be a cylinder or a linear motor, and the driving direction thereof is consistent with the moving direction of the electrode, so that the cutter mounting base is driven to move in parallel with the electrode, and the cutter driving member can be a cylinder, and drives the movable cutter 1333 close to or away from the fixed cutter 1331. The electrodes are cut when the electrodes move to a cutting position.

It should be noted that in the present embodiment, the second linear driving structure and the third linear driving structure may be integrated into one piece, that is, the cutter mounting base and the clamping-plate mounting base are mounted on the same moveable base plate 110, and the moveable base plate 110 is driven by the linear driving motor. Certainly, in other preferred embodiments, the second linear driving structure and the third linear driving structure may also be separately provided, thereby ensuring that the cutter assembly 133 and the clamping-plate feeding assembly 131 can move independently of each other.

It should be noted that the driving member mentioned in the present embodiment includes, but is not limited to, a cylinder, an oil cylinder, a stepping motor, and the like.

The operation principle of the non-stop constant-speed efficient winding machine for separator 100 provided in the present embodiment is described in detail below.

During the process of feeding electrode for manufacturing the jellyroll, the speed of the electrode is divided into three stages: an acceleration stage, a constant-speed stage, and a deceleration stage, meanwhile, the movement of the clamping-plate feeding assembly 131 and the cutter assembly 133 also includes three same stages. When starting the winding for manufacturing the jellyroll, the sheet feeding speed of the electrode is accelerated from zero until the constant-speed stage is reached, and after a period of time, the clamping-plate feeding assembly 131 and the cutter assembly 133 start the sheet feeding action. In this case, the movable clamping plate 1313 in the clamping-plate feeding assembly 131 is in an opened state, and after a short period of acceleration, the speed of the clamping-plate feeding assembly 131 and the cutter assembly 133 is consistent with the sheet feeding speed of the electrode, then a relatively stationary state is reached in space, and the electrode is cut off after the electrode reaches a preset length. The speed curve of the clamping-plate assembly and the action setting of the cutter assembly 133 are designed using different speed characteristics of the electrode at the sheet feeding stage, and by adopting the manner of synchronous chase cutting, the separator is at a constant speed without stopping during the cutting and feeding stage for the electrode.

Meanwhile, the winding head 151 starts to switch the working station, the winding needle 153 on the winding position 155 is switched to the taping position 157, and during the station switching, the rotational winding action of the winding needle 153 continues, after the jellyroll is wound to a preset length, the cutter completes the cutting action, and when the cutting action is completed, the clamping-plate feeding assembly 131 and the cutter assembly 133 enter a deceleration stage, completing the winding of the remaining electrode. The separator is fed after the electrode is cut, and the separator is thermally compounded by the separator compounding mechanism 190, wherein the heating assembly is used for heating itself, and meanwhile the first hot press roller 193 and the second hot press roller 195 clamp the separator by approaching against each other while rotating, then the rollers carry out the hot pressing to fit the separators, further the separator is thermally compounded into one piece. In this case, the rotation speed of the winding needle 153 located at the winding position 155 after the station switching has been consistent with the speed of the separator, the cutting roller 175 also reaches the same speed, and the cutter on the cutting roller 175 and the winding needle 153 are relatively stationary in the linear speed direction of the separator. When the separator is thermally compounded and then passes through the winding needle 153 at the winding position 155, the separator can be attached to the winding needle 153 by a mechanism or vacuum, that is, the winding needle 153 adsorbs and winds the separator, and at the same time, the separator is cut off by the cutting roller 175, the separator end after the cut-off is wound in the next round by the winding needle 153 at the winding position 155, the separator tail continues to enter the taping position 157, and is wound by the winding needle 153 at the taping position 157, and the tape adhering is realized by the taping roller 1541. The rotation of the winding head 151 and the rotation of the winding needle 153 itself enable the replacement of the winding position 155 by means of speed matching, ensuring constant-speed winding of the separator. After the electrode is cut off, the separator end and the separator tail are thermally compounded in length, and only the separator is thermally compounded, thus bonding double-layer separators into a whole. During the constant-speed process of the separator end and the separator tail, the separator is cut off at a constant speed, and at the same time, the new thermally compounded separator is adsorbed by the new winding needle 153, and directly enters the winding state of the separator, and the separator tail after cut-off enters the taping position 157 to continue the winding.

After entering the taping position 157, the separator pressing mechanism 158 and the pressing mechanism 156 can be used to ensure smooth ending of the separator tail, and the tape adhering is carried out by the taping mechanism 154. Specifically, the taping roller 1541 on the taping mechanism 154 can rotate autonomously, and through movement control, the tape adhering is performed when the taping roller 1541 and the jellyroll on the winding needle 153 at the taping position 157 are relatively stationary. Then, the separator pressing mechanism 158 guarantees that the separator tail is not loosened, and meanwhile, the pressing mechanism 156 guarantees that the jellyroll is not loosened. At the same time, the winding process of the subsequent separator is completed with rotation of the winding needle 153 located at the taping position 157. When the winding operation is to be completed, the taping roller 1541 on the taping mechanism 154 rotates to abut against the jellyroll, to attach the tape prepared in advance on the taping roller 1541 to the jellyroll, completing the tape adhering process, and realizing the ending tape adhering.

In the present embodiment, after the above optimization, the separator is wound at a constant speed all the time, the efficiency of the winding process is improved, the influence of tension fluctuations caused by the fact that the existing winding machines need to accelerate and decelerate after completing one jellyroll is avoided, and the influence of timing is also avoided, improving the quality of the jellyroll. By optimizing the operation timing of the winding head 151 at the winding position 155, simultaneous rotation and revolution of the winding needle 153 on the winding head 151 during the station switching is ensured, and the subsequent ending time of the winding process is advanced, thus further improving the efficiency of the winding process.

To sum up, the non-stop constant-speed efficient winding machine for separator 100 provided in the present embodiment implements the synchronous chase cutting function of the electrode through the movably arranged clamping-plate feeding assembly 131 and the cutter assembly 133, ensuring to realize the cutting while the feeding of the electrode is not stopped, moreover, by changing the action settings in the station switching during the winding process, various procedures can be smoothly and seamlessly connected, and thermally compounded separator is cut by the separator cutting mechanism 170, thereby forming a separator end and a separator tail, wherein the separator end is wound after being directly adsorbed by the winding needle 153 switched to the winding position 155, the separator tail continues to be wound by the winding needle 153 switched to the taping position 157, and during the switching of working station, the rotation of the winding needle 153 continues for continuous winding, and when the action of station switching is completed, a linear speed of rotation of the winding needle 153 at the winding position 155 is consistent with the moving speed of the separator, meanwhile, the separator cutting mechanism 170 cuts off the separator, and the winding needle 153 can directly adsorb the separator end to perform the winding action, thereby realizing the seamless switching of the separator end, thus, the separator can keep a constant-speed motion.

The above-mentioned are merely specific embodiments of the present disclosure, but the scope of protection of the present disclosure is not limited thereto, and any change or substitution that may be easily envisaged by those skilled in the present art within the technical scope disclosed in the present disclosure should fall within the scope of protection of the present disclosure. Therefore, the scope of protection of the present disclosure should be based on the scope of protection of the claims.

What is claimed is:

1. A non-stop constant-speed efficient winding machine for separator, said winding machine comprising:
a base plate, an electrode feeding mechanism, a winding mechanism, a separator cutting mechanism, and a separator compounding mechanism, wherein all of the electrode feeding mechanism, the separator cutting mechanism, the separator compounding mechanism, and the winding mechanism are all provided on the base plate, the separator compounding mechanism is located between the electrode feeding mechanism and the winding mechanism, the electrode feeding mechanism comprises a clamping-plate feeding assembly and a cutter assembly, wherein the clamping-plate feeding assembly is movably installed on the base plate, moves along with the direction of the electrode length and is configured to clamp the electrode when remaining relatively stationary with the electrode, and the cutter assembly is movably provided on the base plate, moves along with the direction of the electrode length, and cuts off the electrode when remaining relatively stationary with the feeding electrode, and the separator compounding mechanism comprises a thermal compounding box, a first hot press roller, and a second hot press roller, wherein the thermal compounding box is installed on the base plate, and a heating assembly is disposed therein, the first hot press roller and the second hot press roller are rotatably installed in the thermal compounding box, the electrode feeding mechanism is configured to feed electrodes and separators to the separator compounding mechanism, and the separator compounding mechanism is configured to thermally compound the separators and tightly clamp the separator; and
the winding mechanism further comprises a winding head and three winding needles rotatably installed on the winding head, the three winding needles each provides a vacuum adsorption structure on an outer circumferential surface of the winding needle, the winding head is rotatably installed on the base plate, and there have three working positions, that is the first one for winding position, the second one for taping position, and the third one for unloading position, the three winding needles are switched clockwise or anticlockwise between the winding position, the taping position, and the unloading position, a separator cutting mechanism is provided close to the winding head for cutting the thermally compounded separator, the separator cutting mechanism comprises a first linear driving structure, a rotational driving structure, and a cutting roller, wherein the first linear driving structure is installed on the base plate, and the rotational driving structure is a motor and connected with the first linear driving structure and configured to get close to or away from the winding position under driving of the first linear driving structure, the cutting roller is connected with the rotational driving structure and configured to rotate under driving of the rotational driving structure, the cutting roller has a separator cutter, and the cutting roller is configured to cut the separator when a rotation speed is the same as a rotation speed of the winding needle located at the winding position, the rotation speed of the winding needle located at the winding position is the same as a moving speed the separator, and the winding needle located at the winding position is configured to suck the cut separator end, and wind the separator end on an outer circumferential surface of a corresponding winding needle, so that the electrodes and the separators are wound to form a jellyroll, so as to realize continuous winding process, the separator is avoided from passing a center of the winding needle, and switching of the jellyroll is realized without decelerating the speed of the separator, a winding needle located at the taping station is configured to wind a separator tail of the jellyroll and adhere a tape to the jellyroll, and a winding needle located at the unloading position is configured to unload the jellyroll to which the tape is adhered.

2. The non-stop constant-speed efficient winding machine for separator according to claim 1, wherein a first hot press driving structure and a second hot press driving structure are both motors and installed in the thermal compounding box, the first hot press driving structure is connected with the first hot press roller and configured to drive the first hot press roller to get close to or away from the second hot press roller, and the second hot press driving structure is connected with the second hot press roller and configured to drive the second hot press roller to get close to or away from the first hot press roller.

3. The non-stop constant-speed efficient winding machine for separator according to claim 2, wherein the separator cutting mechanism comprises a first linear driving structure, a rotational driving structure, and a cutting roller, wherein the first linear driving structure is provided on the base plate, and the rotational driving structure is a motor and in transmission connection with the first linear driving structure and configured to get close to or away from the winding position under driving of the first linear driving structure, the cutting roller is in transmission connection with the rotational driving structure and configured to rotate under driving of the rotational driving structure, the cutting roller has a separator cutter, and the cutting roller is configured to cut the separator when a rotation speed is the same as a rotation speed of the winding needle located at the winding position, wherein the separator cutting mechanism freely chooses a timing of cutting the separator in cooperation with a winding processing.

4. The non-stop constant-speed efficient winding machine for separator according to claim 1, wherein the separator cutting mechanism freely chooses a timing of cutting the separator in cooperation with a winding processing.

5. The non-stop constant-speed efficient winding machine for separator according to claim 1, wherein the winding mechanism further comprises a separator pressing mechanism, the separator pressing mechanism is installed on the base plate, and has a telescopic first pressing arm, an end of the first pressing arm is provided with a first pressing roller, an intermediate passing roller is further provided between each two winding needles, the first pressing arm is configured to abut against the intermediate passing roller between the winding position and the taping position, so that the first pressing roller and the corresponding intermediate passing roller tightly clamp the separator.

6. The non-stop constant-speed efficient winding machine for separator according to claim 1, wherein the winding mechanism further comprises a pressing mechanism for end separator winding, the pressing mechanism is installed on the base plate, and has a telescopic second pressing arm, an end of the second pressing arm is provided with a second pressing roller, and the second pressing roller is configured to abut against the winding needle located at the taping position, so that the second pressing roller tightly presses the separator.

7. The non-stop constant-speed efficient winding machine for separator according to claim 1, wherein the separator cutting mechanism comprises a first linear driving structure, a rotational driving structure, and a cutting roller, wherein the first linear driving structure is provided on the base plate, and the rotational driving structure is a motor and in transmission connection with the first linear driving structure and configured to get close to or away from the winding position under driving of the first linear driving structure, the cutting roller is in transmission connection with the rotational driving structure and configured to rotate under driving of the rotational driving structure, the cutting roller has a separator cutter, and the cutting roller is configured to cut the separator when a rotation speed is the same as a rotation speed of the winding needle located at the winding position, wherein the separator cutting mechanism freely chooses a timing of cutting the separator in cooperation with a winding processing.

* * * * *